United States Patent
Lim (10) Patent No.: US 12,337,802 B2
(45) Date of Patent: Jun. 24, 2025

(54) COMPOSITE NOZZLE FOR AUTOMOBILE

(71) Applicant: NIFCO KOREA INC., Chungcheongnam-do (KR)

(72) Inventor: Heung Hwan Lim, Chungcheongnam-do (KR)

(73) Assignee: NIFCO KOREA INC., Asan-si (KR)

( * ) Notice: Subject to any disclaimer, the term of this patent is extended or adjusted under 35 U.S.C. 154(b) by 415 days.

(21) Appl. No.: 17/776,346

(22) PCT Filed: Sep. 10, 2020

(86) PCT No.: PCT/KR2020/012208
§ 371 (c)(1),
(2) Date: May 12, 2022

(87) PCT Pub. No.: WO2021/096042
PCT Pub. Date: May 20, 2021

(65) Prior Publication Data
US 2022/0402462 A1 Dec. 22, 2022

(30) Foreign Application Priority Data
Nov. 14, 2019 (KR) .................. 10-2019-0146151

(51) Int. Cl.
*B60S 1/02* (2006.01)
*B05B 1/30* (2006.01)
(Continued)

(52) U.S. Cl.
CPC .............. *B60S 1/52* (2013.01); *B05B 1/3006* (2013.01); *B05B 1/323* (2013.01); *B05B 7/08* (2013.01);
(Continued)

(58) Field of Classification Search
CPC ......... B05B 7/08; B05B 1/3006; B05B 1/323; B60S 1/02; B60S 1/54; B60S 1/56
(Continued)

(56) References Cited

U.S. PATENT DOCUMENTS

| 10,919,500 B2 | 2/2021 | Trebouet et al. |
| 2015/0040953 A1* | 2/2015 | Kikuta ...................... B60S 1/56 134/123 |

(Continued)

FOREIGN PATENT DOCUMENTS

| CN | 110114248 A | 8/2019 |
| DE | 10236965 A1 | 3/2004 |

(Continued)

OTHER PUBLICATIONS

Office Action 9-5-2021-008435267, Sep. 5, 2021, pp. 1-4.
(Continued)

*Primary Examiner* — Jason J Boeckmann
(74) *Attorney, Agent, or Firm* — Stinson LLP (57) ABSTRACT

A composite nozzle comprises: a housing having formed at one side thereof a cleaning liquid inlet through which the cleaning liquid is introduced, an installation port communicating with the cleaning liquid inlet at the other side thereof, and an air inlet path communicating with an air inlet on the outer side of the installation port; an opening and closing valve installed so as to be slidably movable toward one side and the other side in the installation port formed in the housing; an elastic body such as a spring that slidably moves the opening and closing valve while elastically supporting the opening and closing valve; and a cap which sprays the cleaning liquid to the outside from the other end of the housing in which the opening and closing valve is installed so as to be slidably movable in one direction and the other direction of the installation port.

6 Claims, 8 Drawing Sheets

(51) Int. Cl.
  *B05B 1/32* (2006.01)
  *B05B 7/08* (2006.01)
  *B05B 15/74* (2018.01)
  *B60S 1/52* (2006.01)
  *B60S 1/54* (2006.01)
  *B60S 1/56* (2006.01)

(52) U.S. Cl.
  CPC ............... *B05B 15/74* (2018.02); *B60S 1/02* (2013.01); *B60S 1/54* (2013.01); *B60S 1/56* (2013.01)

(58) Field of Classification Search
  USPC .............................................. 239/284.1, 570
  See application file for complete search history.

(56) References Cited

U.S. PATENT DOCUMENTS

| | | | | |
|---|---|---|---|---|
| 2015/0151722 A1* | 6/2015 | Gokan | ................... | H04N 23/51 |
| | | | | 134/198 |
| 2019/0219043 A1* | 7/2019 | Kikuta | ................... | F04B 53/10 |
| 2022/0234060 A1* | 7/2022 | Ren | ................... | B60S 1/54 |

FOREIGN PATENT DOCUMENTS

| | | |
|---|---|---|
| JP | 2016000599 A1 | 1/2016 |
| JP | 2019529233 A | 10/2019 |
| KR | 20190059447 A | 5/2019 |
| WO | 2014010580 A1 | 1/2014 |

OTHER PUBLICATIONS

English translation of Office Action 9-5-2021-008435267, Sep. 5, 2021, pp. 1-6.

English Abstract of JP 2016-000599 A, pp. 1-3, [database online], [retrieved on May 3, 2022], Retrieved from J-PlatPat website of Japan Patent Office.

English Abstract of WO 2014-010580 A1, pp. 1-2, [database online], [retrieved on May 3, 2022], Retrieved from J-PlatPat website of Japan Patent Office.

English Abstract of JP 2019-529233 A, pp. 1-2, [database online], [retrieved on May 3, 2022], Retrieved from J-PlatPat website of Japan Patent Office.

First Office Action, and translation thereof, from Chinese Application No. 202080078202.1, dated Jun. 24, 2024, 14 pages.

Decision on Rejection, and translation thereof, from CN Application No. 2020800782021, dated Jan. 14, 2025, 14 pages.

* cited by examiner

COMPOSITE NOZZLE FOR AUTOMOBILE

CROSS-REFERENCE TO RELATED APPLICATIONS

This application is a national stage application of PCT/KR2020/012208, filed Sep. 10, 2020, which claims priority to Korean application 10-2019-0146151, filed Nov. 14, 2019, the entire contents of which are incorporated herein by reference for all purposes.

TECHNICAL FIELD

The present invention relates to a composite nozzle for an automobile, more particularly, to a composite nozzle for an automobile which allows a driver at the wheel to remove contaminants such as dust or rainwater from various camera lenses and side mirrors installed on the automobile by spraying cleaning liquid and air, simultaneously depending on need, onto the various camera lenses and the side mirrors.

BACKGROUND

In general, various detection sensors and camera lenses are installed in the front and rear of an automobile to collect information about places that the driver cannot check with the naked eye and alert it to the driver. Side mirrors are installed at the left and right sides of the front part of the automobile in which the detection sensor and camera lens are installed, that allow the driver to change lanes while visually checking the left and right sides.

However, in the prior art, when the camera lens is contaminated by dust in the air, accurate information cannot be collected and transmitted. Not only that, there is a problem that the driver cannot properly check the left and right sides of the automobile with the naked eye while driving.

In addition, in case of rain, raindrops remain on the camera lens, making it impossible to collect and transmit accurate information; furthermore, there are problems such as that the driver is not able to check the left and right sides of the automobile with the naked eye while driving due to the raindrops remaining on the camera lens.

SUMMARY

The purpose of the present invention, which is designed to solve prior art's problems as described above, is to provide a composite nozzle for an automobile which allows a driver at the wheel to remove contaminants such as dust or rainwater from various camera lenses and side mirrors installed on the automobile by spraying cleaning liquid and air, simultaneously depending on need, onto the various camera lenses and the side mirrors.

In order to solve the subject matter as above, the present invention provides a composite nozzle for an automobile comprising a housing (100) having formed at one side thereof a cleaning liquid inlet (110) through which a cleaning liquid is introduced, an installation port (120) communicating with the cleaning liquid inlet (110) at the other side thereof, and an air inlet path (140) communicating with an air inlet (130) on the outer side of the installation port (120); an opening and closing valve (200) installed so as to be slidably movable toward one side and the other side in the installation port (120) formed in the housing (100); an elastic body (400) such as a spring that slidably moves the opening and closing valve (200) while elastically supporting the opening and closing valve (200); and a cap (150) which sprays the cleaning liquid to the outside from the other end of the housing (100) in which the opening and closing valve (200) is installed so as to be slidably movable in one direction and the other direction of the installation port (120), by means of the self-elastic force of the elastic body (400) and the pressure of the cleaning liquid flowing through the cleaning liquid inlet (110) while allowing air introduced into the air inlet (130) formed in the housing (100) to be sprayed to the outside while moving through the air inlet path (140).

Meanwhile, the opening and closing valve (200) is formed where an inlet groove (211) is dug through which the cleaning liquid introduced through the cleaning liquid inlet (110) is introduced; and is composed of a first valve (210) which is formed through a supply hole (212) communicating with the inlet groove (211), an opening and closing material (230) fitted to the outer side of the first valve (210) so that the supply hole (212) is opened and closed while being deformed by its own elastic force according to the hydraulic pressure of the cleaning liquid introduced through the inlet groove (211), and a supply hole (221) having a locking protrusion (221a) for preventing the first valve (210) coupled to the outer side of the opening and closing material (230) from being inserted by more than a predetermined value, which are formed by digging in one side portion; and a second valve (220) formed by passing a cleaning liquid injection hole (222) communicating with the supply hole (221) through the other side portion.

In addition, the opening and closing material (230) is composed of a cylindrical enclosure (232) of a rubber material having an outer diameter smaller than an inner diameter of the supply hole (221), wherein the enclosure (232) is composed of a head (231) for maintaining airtightness between the first valve (210) and the second valve (220) fitted to the outer surface; and an insertion hole (233) having the same inner diameter as the outer diameter of the first valve (210) in which the supply hole (212) is formed is formed through the head (231) and the enclosure (232).

Meanwhile, an installation port (120) in which a second valve (220) is installed and a fitting groove (152) in which the other end of the housing (100) where an air inlet path (140) is formed is insert-coupled; an air inlet groove (154) through which the air supplied to the air inlet path (140) formed in the housing (100) is introduced; an air injection hole (153) for injecting the air introduced into the air inlet groove (154) to the outside; and the inlet and outlet holes (151) through which the other side of the second valve (220) is drawn in and out are formed so that the cleaning liquid injection hole (222) is exposed to the outside; are each formed in the cap (150).

In addition, two or more fluid flow grooves (221a') are formed by digging in the locking protrusion (221a) formed in the supply hole (221) of the second valve (220) at a constant interval.

According to the present invention, the driver of an automobile can spray air or cleaning liquid optionally to the camera lens and side mirrors through an air inlet path formed in the housing and an opening and closing valve installed in the housing, to remove pollutants such as dust and rainwater on the camera lens and side mirrors.

On the other hand, according to the present invention, when it is desired to wash the camera lens and the side mirrors installed in an automobile, the opening and closing valve is drawn out of the housing by the pressure of the cleaning liquid to spray on the side mirrors and the camera lens, and when the cleaning liquid is not sprayed on the camera lens or side mirrors, the opening and closing valve remains ensconced in the housing, thereby preventing the opening and closing valve from being contaminated by contaminants such as dust contained in the atmosphere.

DETAILED DESCRIPTION

Hereinafter, the technical features of the present invention will be described in detail with reference to the accompanying drawings.

Figure 1:
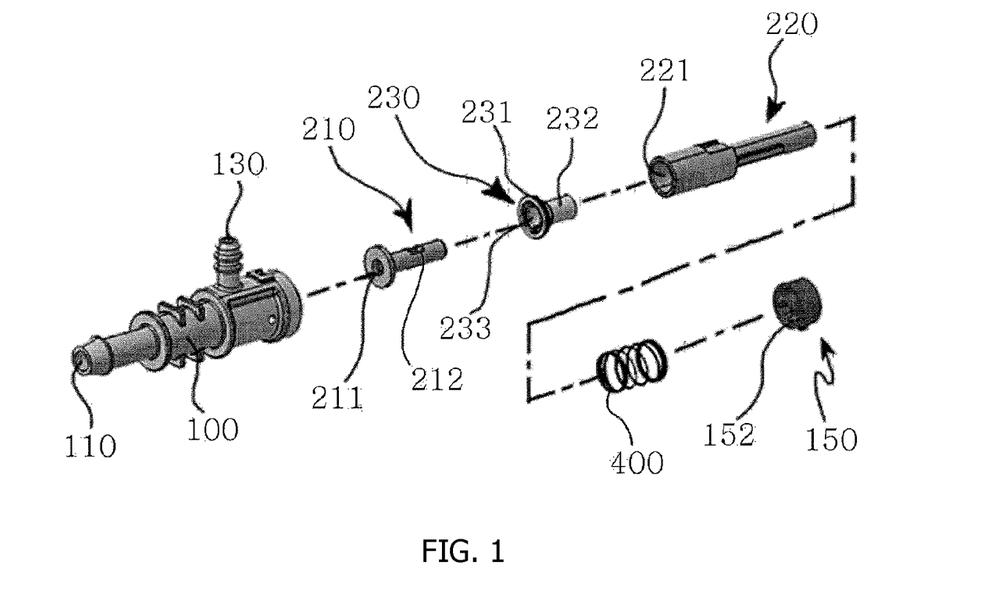
FIG. 1 is an exploded perspective view showing the configuration of a composite nozzle for an automobile according to the present invention.
Figure 2:
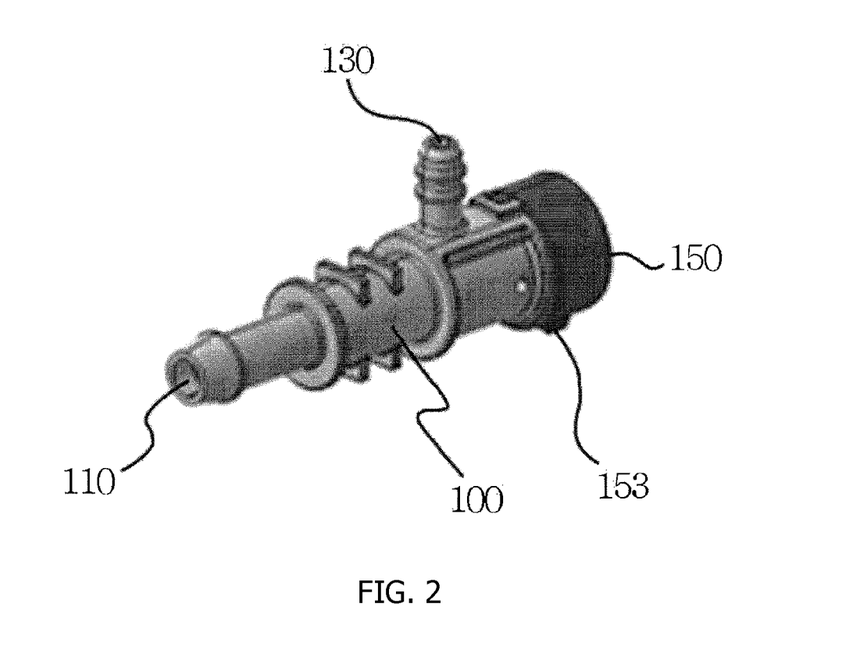
FIG. 2 is a perspective view showing the assembly state of a composite nozzle for an automobile according to the present invention.
Figure 3:
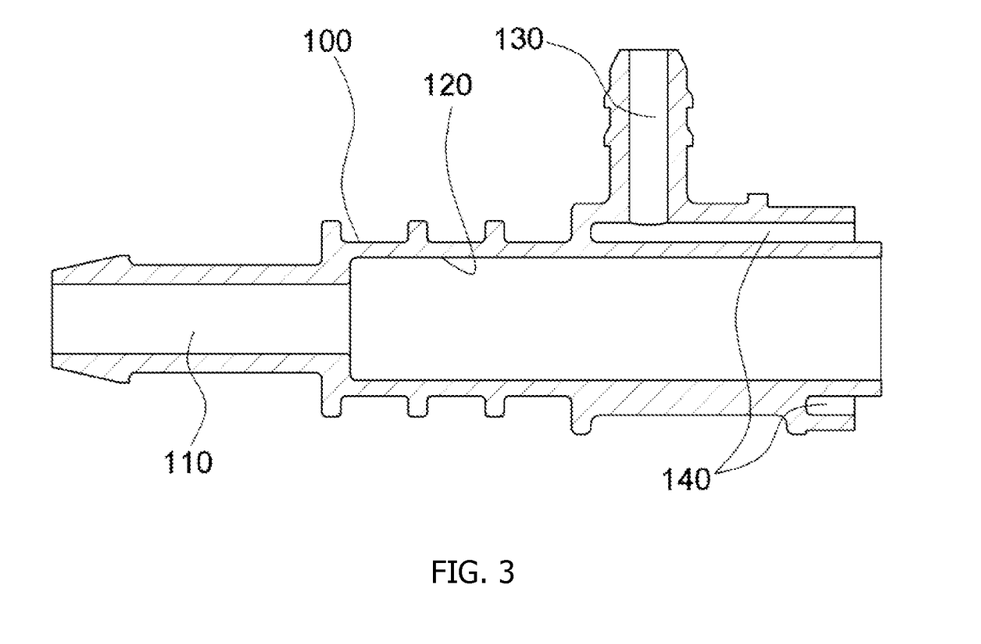
FIG. 3 is a cross-sectional view showing the housing of a composite nozzle for an automobile according to the present invention.
Figure 4:
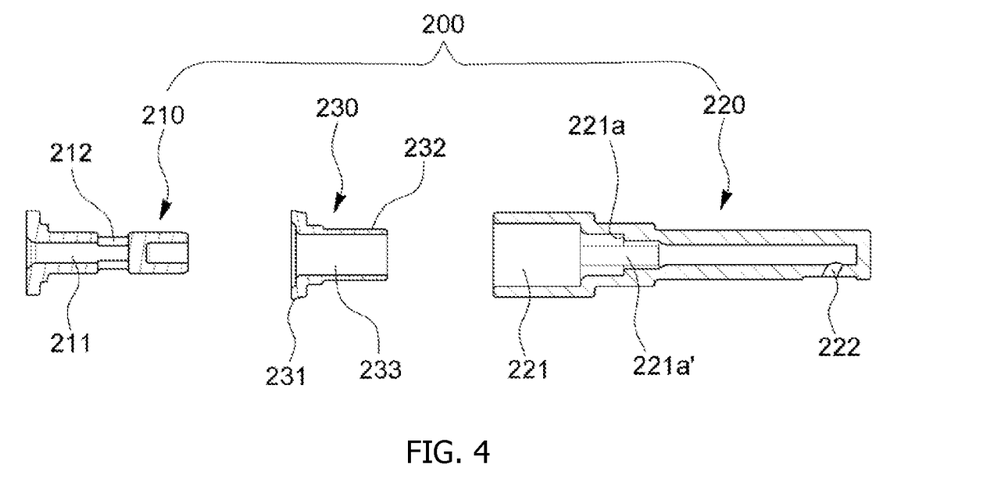
FIG. 4 is an exploded cross-sectional view showing the configuration of a check valve of a composite nozzle for an automobile according to the present invention.
Figure 5:
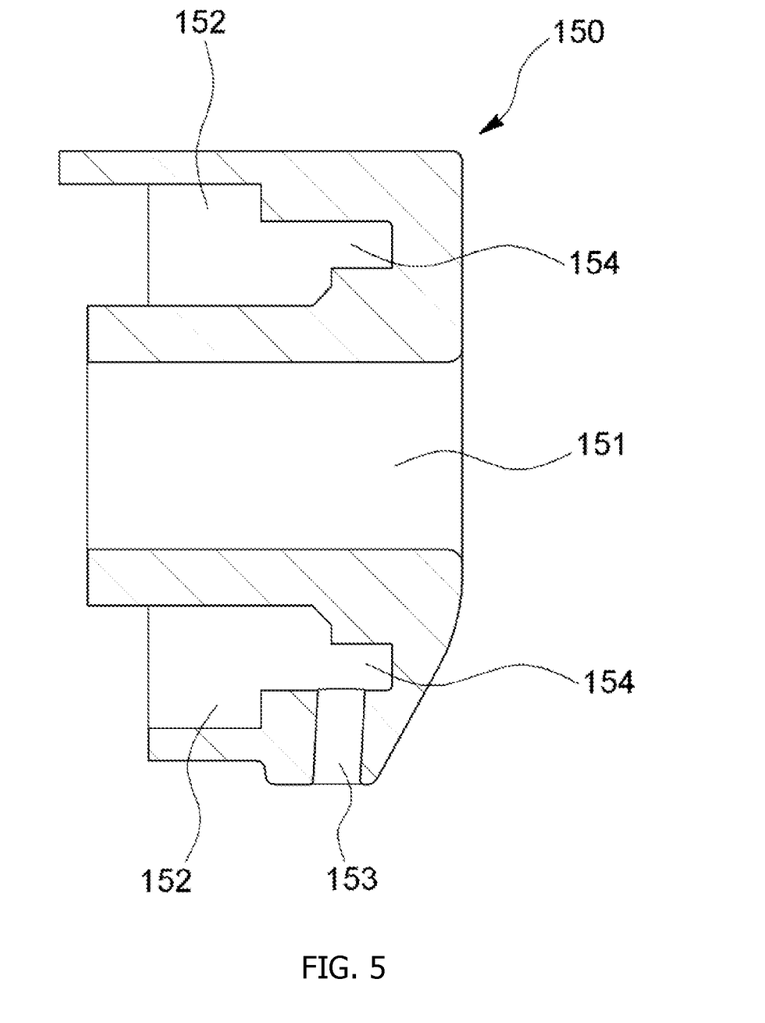
FIG. 5 is a cross-sectional view showing the configuration of a cap for a composite nozzle for an automobile according to the present invention.
Figure 6:
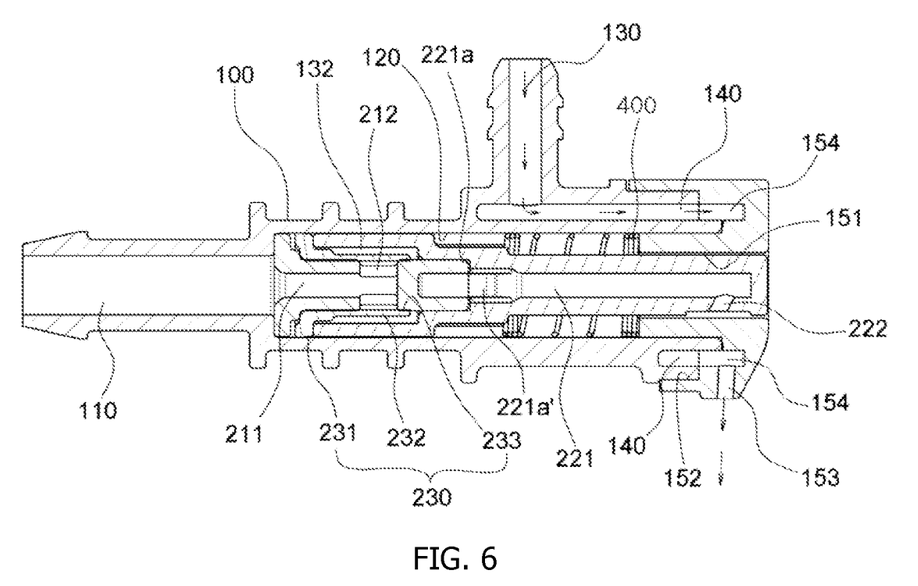
FIG. 6 is a cross-sectional view showing the configuration of a composite nozzle for an automobile according to the present invention.
Figure 7:
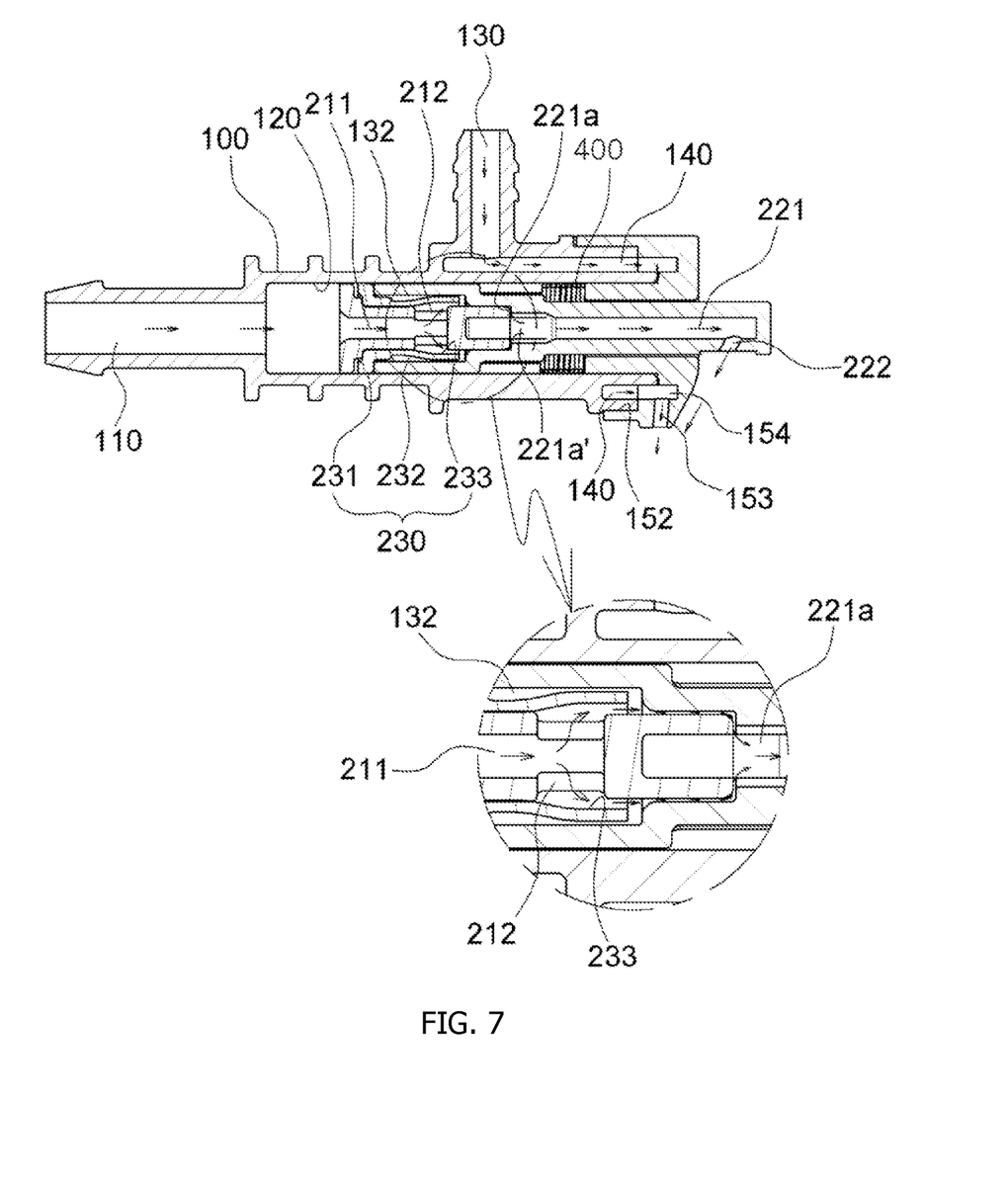
FIG. 7 is a cross-sectional view showing the state of an operation of a composite nozzle for an automobile of the present invention in which a cleaning liquid is sprayed.
Figure 8:
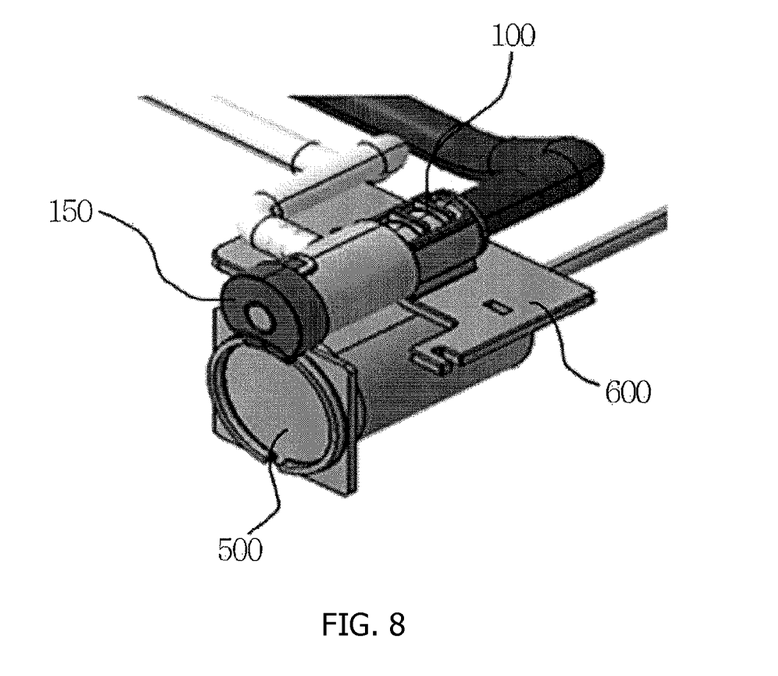
FIG. 8 is a view showing a state in which a composite nozzle for an automobile according to the present invention is mounted.
Figure 9:
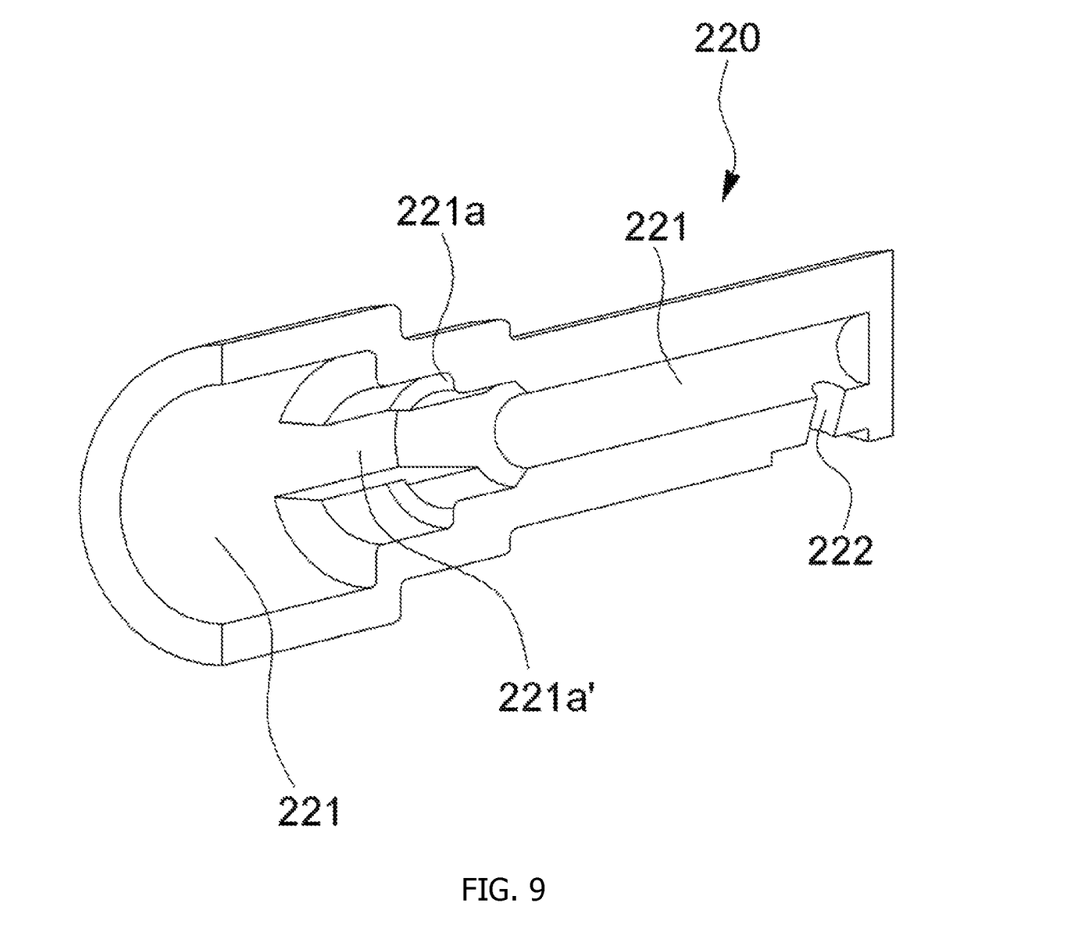
FIG. 9 is a cross-sectional perspective view showing the configuration of a second valve for a composite nozzle for an automobile according to the present invention.
Figure 10:
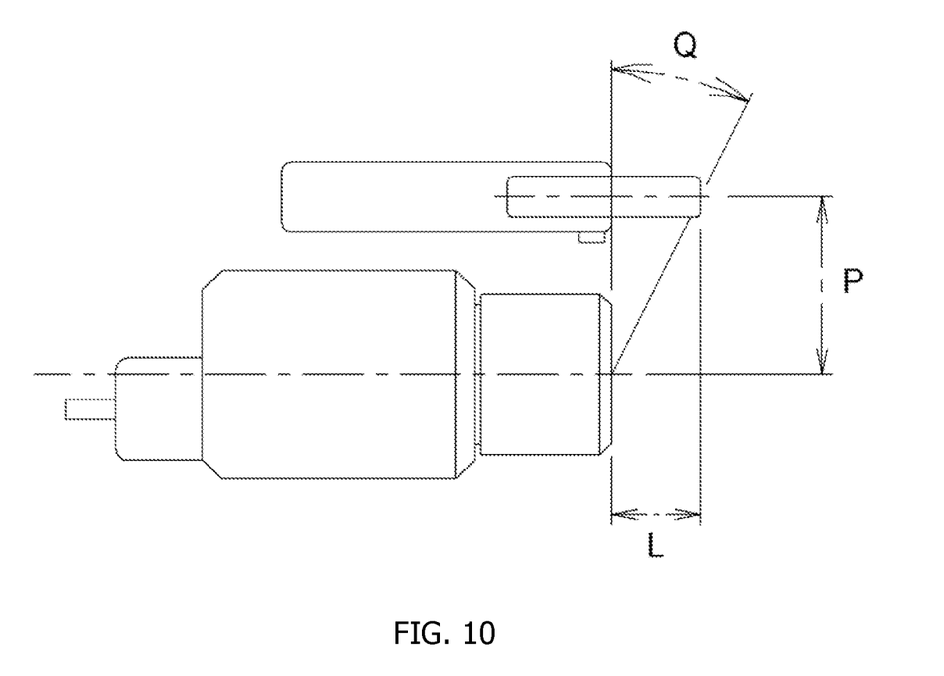
FIG. 10 is an installation state view schematically showing a state in which a composite nozzle for an automobile according to the present invention is coupled to a fixed body in which a camera lens is installed.

FIG. 1 is an exploded perspective view showing the configuration of a composite nozzle for an automobile according to the present invention; FIG. 2 is a perspective view showing the assembly state of a composite nozzle for an automobile according to the present invention; FIG. 3 is a cross-sectional view showing the housing of a composite nozzle for an automobile according to the present invention; FIG. 4 is an exploded cross-sectional view showing the configuration of a check valve of a composite nozzle for an automobile according to the present invention; FIG. 5 is a cross-sectional view showing the configuration of a cap for a composite nozzle for an automobile according to the present invention; FIG. 6 is a cross-sectional view showing the configuration of a composite nozzle for an automobile according to the present invention; FIG. 7 is a cross-sectional view showing the state of an operation of a composite nozzle for an automobile of the present invention in which a cleaning liquid is sprayed; FIG. 8 is a view showing a state in which a composite nozzle for an automobile according to the present invention is mounted; FIG. 9 is a cross-sectional perspective view showing the configuration of a second valve for a composite nozzle for an automobile according to the present invention; and FIG. 10 is an installation state view schematically showing a state in which a composite nozzle for an automobile according to the present invention is coupled to a fixed body in which a camera lens is installed.

As illustrated in FIGS. 1 to 10, the composite nozzle for an automobile according to the present invention comprises a housing (100) having formed at one side thereof a cleaning liquid inlet (110) through which a cleaning liquid is introduced, an installation port (120) communicating with the cleaning liquid inlet (110) at the other side thereof, and an air inlet path (140) communicating with an air inlet (130) on the outer side of the installation port (120); an opening and closing valve (200) installed so as to be slidably movable toward one side and the other side in the installation port (120) formed in the housing (100); an elastic body (400) such as a spring that slidably moves the opening and closing valve (200) while elastically supporting the opening and closing valve (200); and a cap (150) which sprays the cleaning liquid to the outside from the other end of the housing (100) in which the opening and closing valve (200) is installed so as to be slidably movable in one direction and the other direction of the installation port (120), by means of the self-elastic force of the elastic body (400) and the pressure of the cleaning liquid flowing through the cleaning liquid inlet (110) while allowing air introduced into the air inlet (130) formed in the housing (100) to be sprayed to the outside while moving through the air inlet path (140).

Meanwhile, the opening and closing valve (200) is formed where an inlet groove (211) is dug through which the cleaning liquid introduced through the cleaning liquid inlet (110) is introduced; and is composed of a first valve (210) which is formed through a supply hole (212) communicating with the inlet groove (211), an opening and closing material (230) fitted to the outer side of the first valve (210) so that the supply hole (212) is opened and closed while being deformed by its own elastic force according to the hydraulic pressure of the cleaning liquid introduced through the inlet groove (211), and a supply hole (221) having a locking protrusion (221a) for preventing the first valve (210) coupled to the outer side of the opening and closing material (230) from being inserted by more than a predetermined value, which are formed by digging in one side portion; and a second valve (220) formed by passing a cleaning liquid injection hole (222) communicating with the supply hole (221) through the other side portion.

In addition, the opening and closing material (230) is composed of a cylindrical enclosure (232) of a rubber material having an outer diameter smaller than an inner diameter of the supply hole (221), wherein the enclosure (232) is composed of a head (231) for maintaining airtightness between the first valve (210) and the second valve (220) fitted to the outer surface; and an insertion hole (233) having the same inner diameter as the outer diameter of the first valve (210) in which the supply hole (212) is formed is formed through the head (231) and the enclosure (232).

Meanwhile, an installation port (120) in which a second valve (220) is installed and a fitting groove (152) in which the other end of the housing (100) where an air inlet path (140) is formed is insert-coupled; an air inlet groove (154) through which the air supplied to the air inlet path (140) formed in the housing (100) is introduced; an air injection hole (153) for injecting the air introduced into the air inlet groove (154) to the outside; and the inlet and outlet holes (151) through which the other side of the second valve (220)

is drawn in and out are formed so that the cleaning liquid injection hole (222) is exposed to the outside; are each formed in the cap (150).

In addition, two or more fluid flow grooves (221a') are formed by digging in the locking protrusion (221a) formed in the supply hole (221) of the second valve (220) at a constant interval.

The assembly of the present invention comprised as above is completed when the opening and closing valve (200) is inserted into the installation port (120) that is installed in the housing (100), so as to be elastically supported by an elastic body (400) such as a spring and thereafter, the other end of the housing (100) is inserted into the fitting groove (152) of the cap (150).

Here, the opening and closing valve (200) is inserted, such that the first valve (210), whose outer surface is fitted to the enclosure (232) of the opening and closing material (230), is primarily positioned in one direction of the installation port (120) and thereafter, the second valve (220) is inserted, such that the enclosure (232) of the opening and closing material (230) is accommodated in the supply hole (211), and an elastic body (400) having its own elastic force, such as a spring, is installed between the second valve (220) and the cap (150).

As a result, when the cleaning liquid is primarily introduced into the inlet groove (211) of the first valve (210) through the cleaning liquid inlet (110) formed in the housing (100), the elastic body (400) such as a spring is compressed by the pressure of the cleaning liquid flowing into the inlet groove (211), and the opening and closing valve (200) slides to the other side of the housing (100) as much as the elastic body (400) is compressed, exposing the other side of the second valve (220) outside through the inlet and outlet hole (151) formed in the cap (150).

After the other side of the second valve (220) is exposed to the outside through the inlet and outlet hole (151) formed in the cap (150) while sliding to the other side of the housing (100), the outer surface of the enclosure (232) of the opening and closing material (230) that is in contact with the inner wall surface of the insertion hole (233) on the outer surface of the first valve (210) is expanded outwardly to a position where it contacts the inner wall surface of the supply hole (221) by the pressure of the cleaning liquid to be ejected to the outside through the supply hole (212) as it flows into the inlet groove (211) of the first valve (210), forming a cleaning liquid discharge path (240), through which the cleaning liquid flowing into the inlet groove (211) of the first valve (210) through the supply hole (212) is ejected.

As described above, the cleaning liquid is transferred through a fluid flow groove (221a') formed in the supply hole (221) of the second valve (220), thus the cleaning liquid being ejected to the outside of the first valve (210) through the cleaning liquid discharge path (240).

Meanwhile, when the cleaning liquid is not supplied to the cleaning liquid inlet (110), because the cleaning liquid does not flow into the inlet groove (211) of the first valve (210), the opening and closing material (230) is contracted by its own elastic force, thereby bringing the inner wall surface of the insertion hole (233) into contact with the outer surface of the first valve (210), so that the cleaning liquid may not leak to the outside of the first valve (210) and at the same time, the opening and closing valve (200) is moved in one direction of the installation port (120) by the elastic force of the elastic body (400) installed between the cap (150) and the second valve (230) and thereby, the other side of the second valve (220) is introduced into the housing (100) through the inlet and outlet hole (151) of the cap (150).

As a result, the cleaning liquid injection hole (222) communicating with the supply hole (221) of the second valve (220) is prevented from being contaminated by contaminants such as dust in the outside air.

At this time, the outer surface of the first valve (210) maintains a close contact with the inner surface of the insertion hole (233) of the opening and closing material (230), and the second valve (220) and the first valve (210) remain in close contact at the outer surface of the head (231) of the opening and closing material (230), thereby preventing the cleaning liquid from leaking to the outside of the housing (100).

In addition, when air is introduced through the air inlet (130) formed on the outer side of the installation port (120) of the housing (100), air is introduced to the outside of the installation port (120) in which the opening and closing valve is installed through the air inlet path (140) formed to communicate with the air inlet (130), and the air introduced into the air inlet path (140) is injected to the outside through the air injection hole (153) formed in the cap (150).

As a result, as shown in FIG. 8 in which the cap (150) is coupled to the housing (100) as described above, when it is installed such that in a state in which camera lenses (500) or side mirrors are fixedly installed on the fixed body (600), the cleaning liquid and air injected through the cap (150) are injected onto the camera lens (500) or the side mirrors through the cleaning liquid injection hole (222) and the air injection hole (153) that are withdrawn and let out through the inlet and outlet holes (151) formed in the cap (150), the driver of an automobile can derive the automobile while conveniently removing the contaminants using a cleaning liquid and air as needed, even when the camera lenses (500) or side mirrors are contaminated by an external material.

Here, as shown in FIG. 10, the housing (100) is coupled to a fixed body (600) in which a camera lens (500) is installed so that the second valve (220) where a cleaning liquid injection hole (222) is formed is located at a position that protrudes at least 5 mm from the camera lens (500), thereby avoiding mutual interference by the protrusion distance (L) formed between the second valve (220) and the camera lens (500), when the cleaning liquid is sprayed through the cleaning liquid injection hole (222). Meanwhile, the start point angle (Q) of a cleaning liquid injected to the camera lens (500) through the cleaning liquid injection hole (222) is set within 25°~35°, thereby allowing the cleaning liquid to be injected more efficiently.

In addition, the fixed body (600) in which the camera lens (500) is installed and the housing (100) which is coupled to the fixed body (600) are coupled to maintain the distance (P) within 20 mm and thus, it is injected onto the camera lens (500) in a state where the injection pressure of the cleaning liquid injected through the cleaning liquid injection hole (222) of the second valve (220) installed in the housing (100) is not lost, thereby making it possible to clean the camera lens (500) more efficiently.

| DESCRIPTION OF REFERENCE NUMERALS | |
|---|---|
| 100: housing | 110: cleaning liquid inlet |
| 120: installation port | 130: air inlet |
| 140: air inlet path | 150: cap |
| 151: inlet and out hole | 152: fitting groove |
| 153: air injection hole | 200: opening and closing valve |
| 210: first valve | 211: inlet groove |
| 212: supply hole | 220: second valve |
| 221: supply hole | 222: cleaning liquid injection hole |
| 230: opening and closing material | 231: head |

DESCRIPTION OF REFERENCE NUMERALS

232: enclosure  233: insertion hole
400: elastic body

The invention claimed is:

1. A composite nozzle for an automobile comprising, a housing having formed at one side thereof a cleaning liquid inlet through which a cleaning liquid is introduced, an installation port communicating with the cleaning liquid inlet at an other side thereof, and an air inlet path communicating with an air inlet on an outer side of the installation port;

an opening and closing valve installed so as to be slidably movable toward one side and an other side in the installation port formed in the housing;

an elastic body having a self-elastic force that slidably moves the opening and closing valve while elastically supporting the opening and closing valve; and a cap which sprays the cleaning liquid to an outside from the other side of the housing in which the opening and closing valve is installed so as to be slidably movable toward one side of the installation port and in another direction toward the other side of the installation port, by means of the self-elastic force of the elastic body and a pressure of the cleaning liquid flowing through the cleaning liquid inlet while allowing air introduced into the air inlet on the outer side of the installation port to be sprayed to the outside while moving through the air inlet path, wherein the opening and closing valve is formed where an inlet groove is formed in a first side portion of the opening and closing valve through which the cleaning liquid introduced through the cleaning liquid inlet is introduced; the opening and closing valve comprising, a first valve through which is formed a first supply hole communicating with the inlet groove, an opening and closing material fitted to the outer side of the first valve so that the first supply hole is opened and closed while the opening and closing material is being deformed by its own elastic force according to a hydraulic pressure of the cleaning liquid introduced through the inlet groove, and a second valve having a second supply hole in a first side of the second valve having a locking protrusion for preventing the first valve with the opening and closing material fitted to the outer side of the first valve from being inserted by more than a predetermined value, and a cleaning liquid injection hole in a second side of the second valve communicating with the second supply hole, wherein the opening and closing material comprises a cylindrical enclosure of a rubber material having an outer diameter smaller than an inner diameter of the second supply hole, wherein the enclosure comprises a head for maintaining airtightness between the first valve and the second valve at an outer surface of the head; and an insertion hole having the same inner diameter as an outer diameter of the first valve in which the first supply hole is formed, is formed through the head and the enclosure.

2. The composite nozzle for an automobile according to claim 1, the cap further comprising, a fitting groove in which an installation port where a second valve is installed and the other end of the housing where the air inlet path is formed is insert-coupled;

an air inlet groove through which the air supplied to the air inlet path formed in the housing is introduced;

an air injection hole for injecting the air introduced into the air inlet groove to the outside; and inlet and outlet holes through which the other side of the second valve is drawn in and out are formed so that the cleaning liquid injection hole is exposed to the outside.

3. The composite nozzle for an automobile according to claim 1, further comprising two or more fluid flow grooves formed in the locking protrusion formed in the second supply hole of the second valve at a constant interval.

4. The composite nozzle for an automobile according to claim 1, wherein the housing is coupled to a fixed body in which a camera lens is installed so that the second valve where the cleaning liquid injection hole is formed is located at a position that protrudes at least 5 mm from the camera lens.

5. The composite nozzle for an automobile according to claim 4, further comprising a start point angle of a cleaning liquid injected to the camera lens through the cleaning liquid injection hole is set within 25°~35°.

6. The composite nozzle for an automobile according to claim 4, further comprising the fixed body in which the camera lens is installed and the housing which is coupled to the fixed body are coupled to maintain the distance within 20 mm.

* * * * *